UNITED STATES PATENT OFFICE.

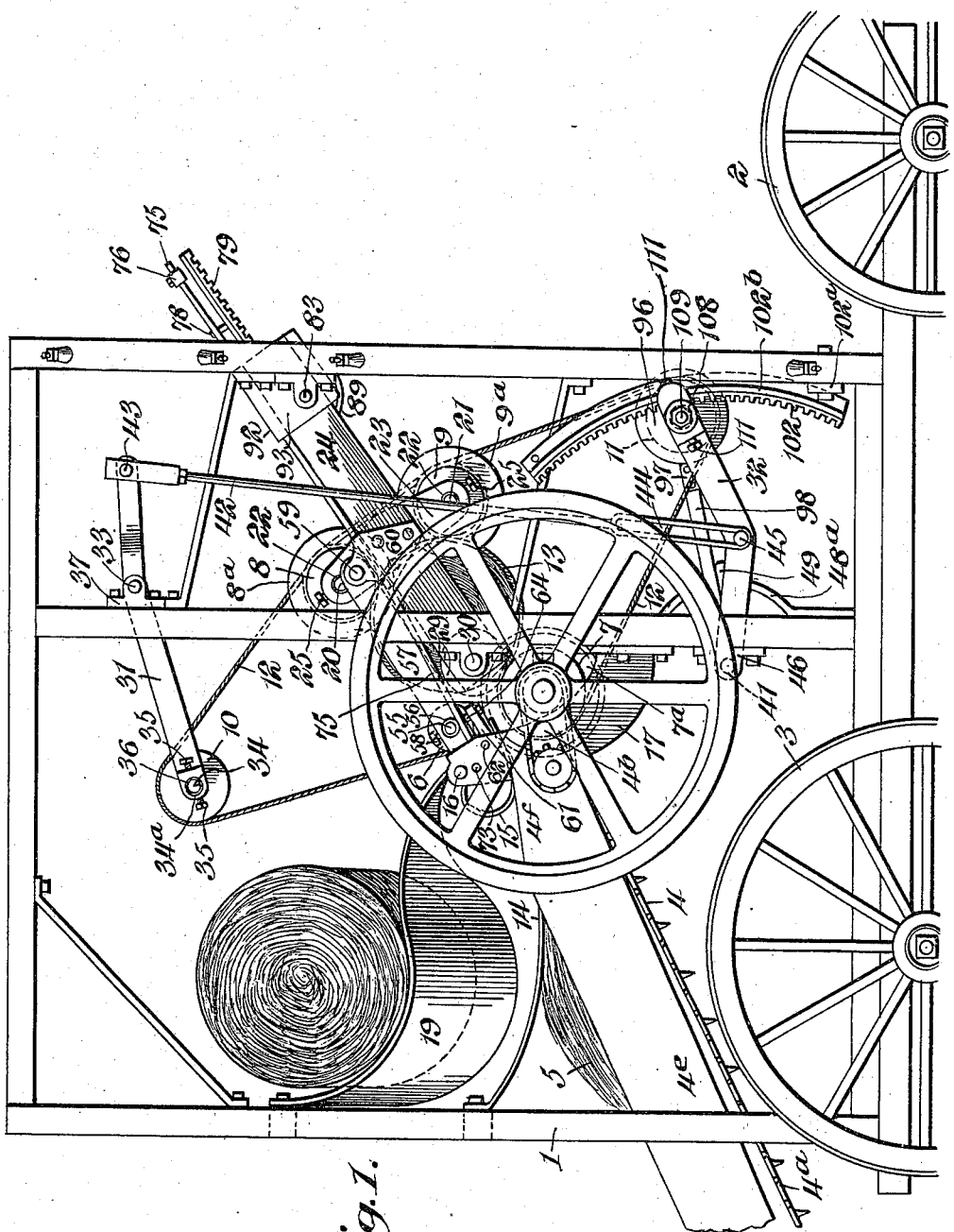

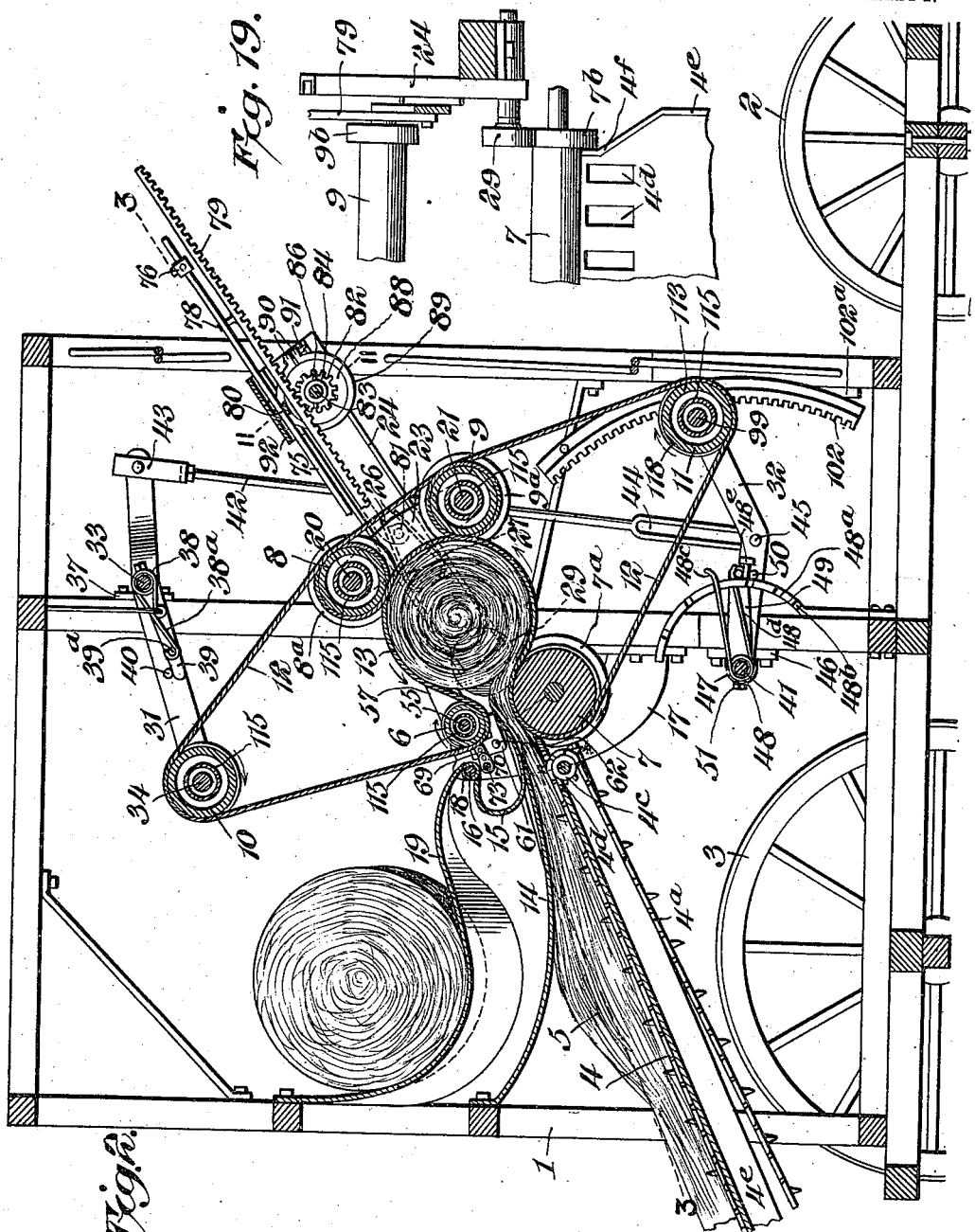

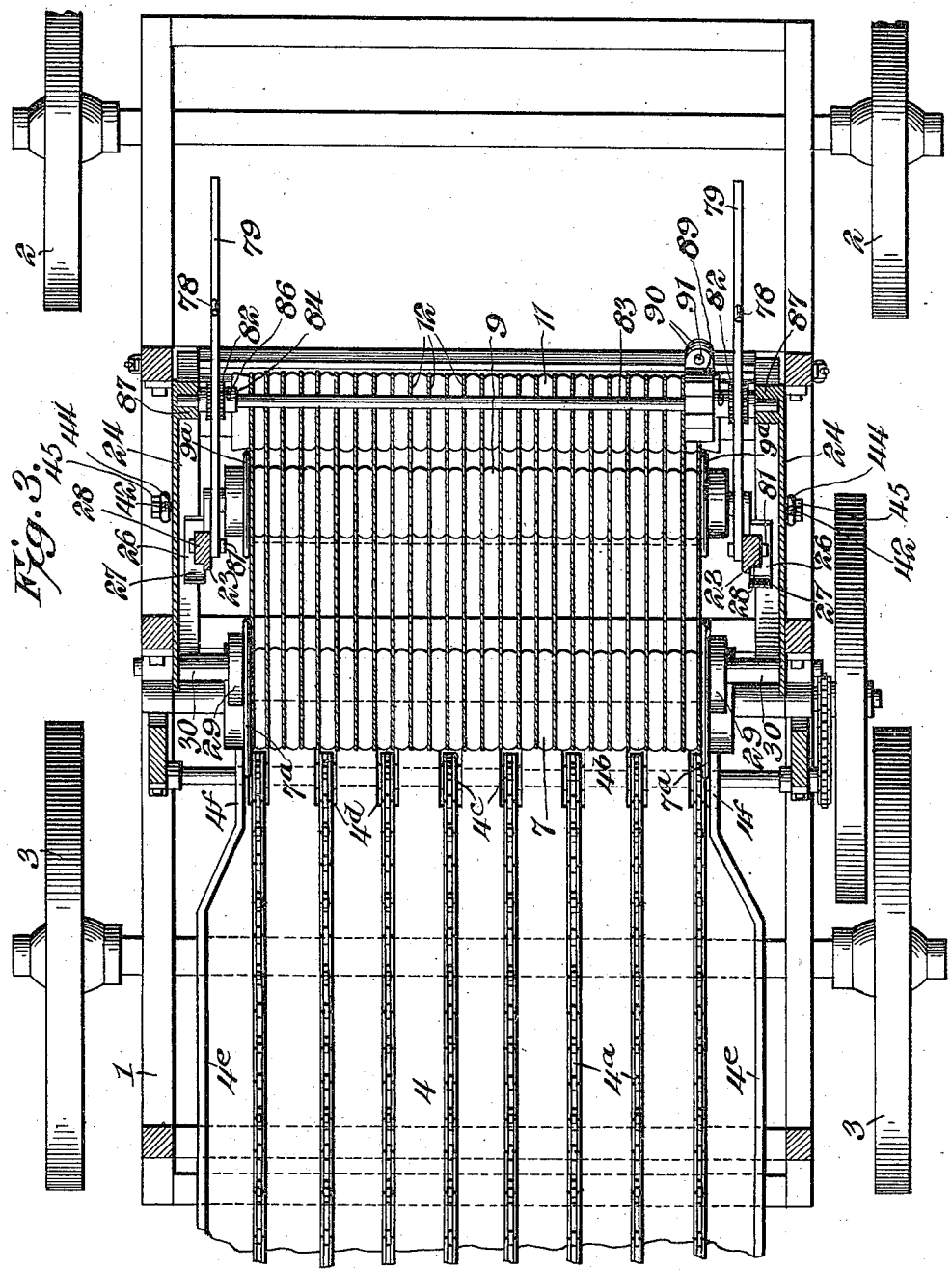

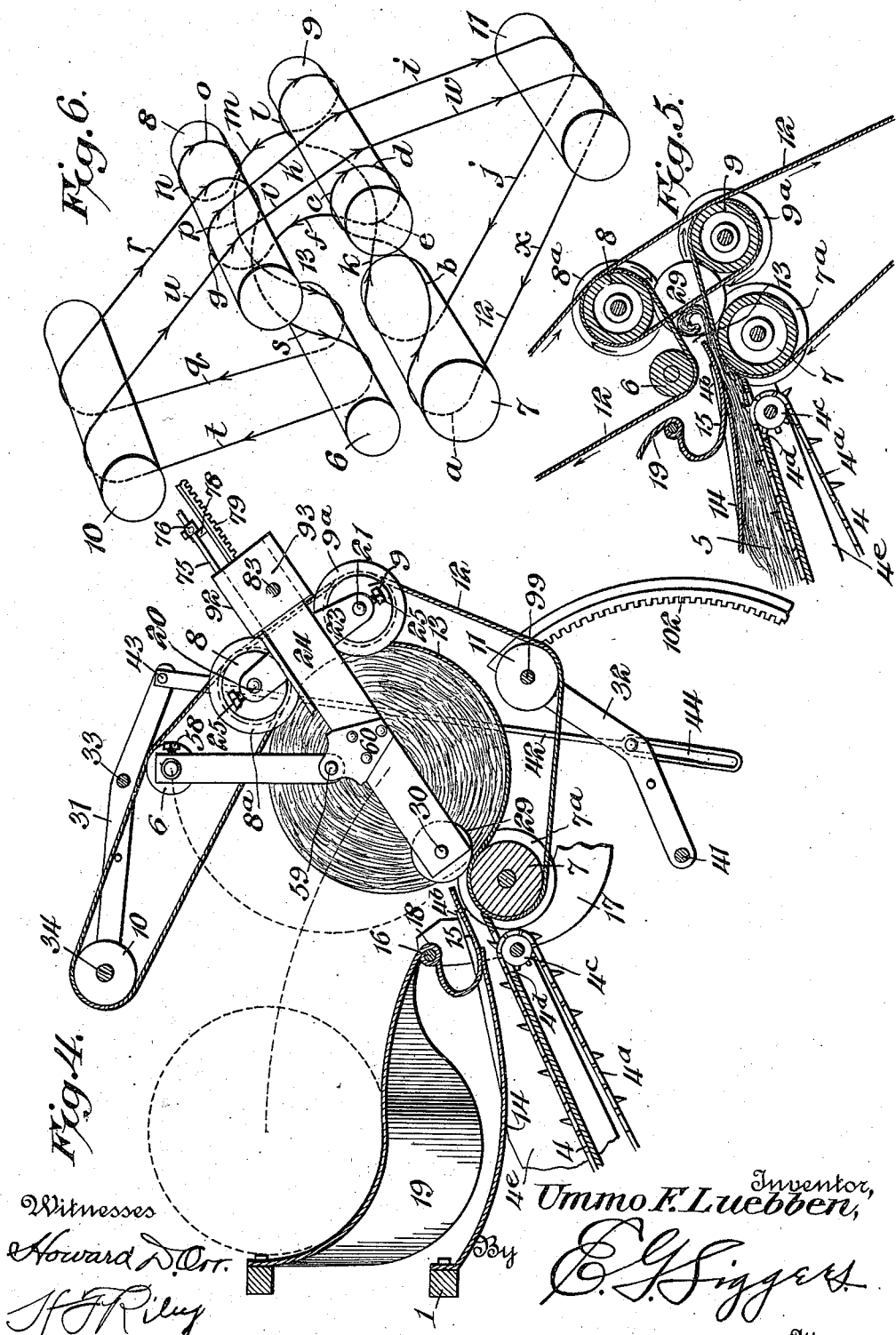

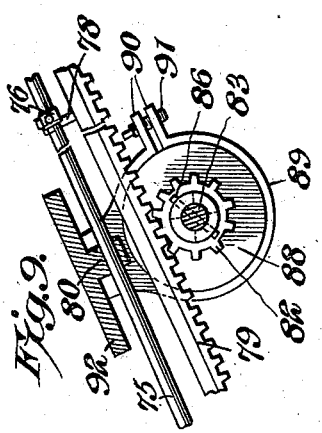

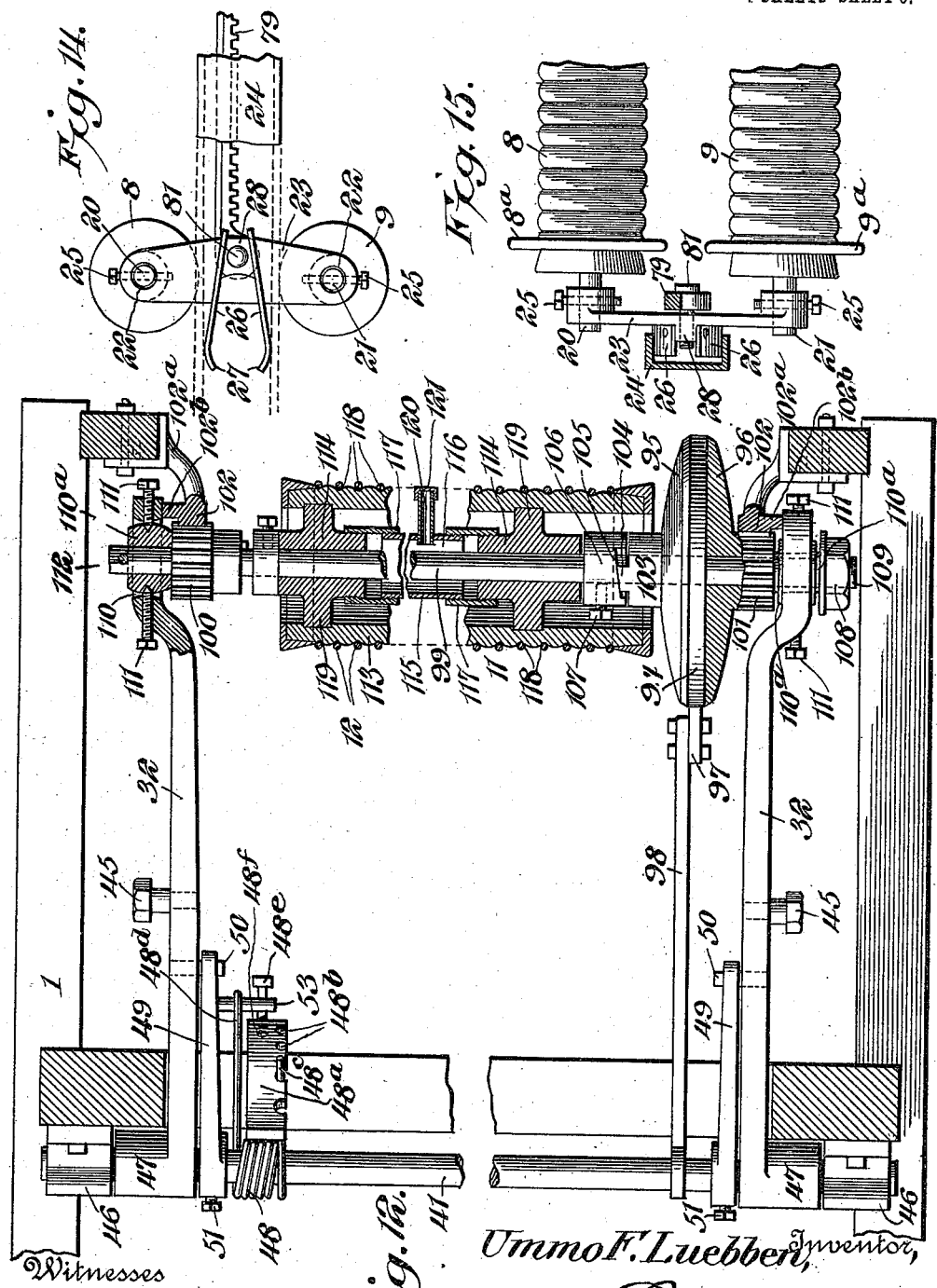

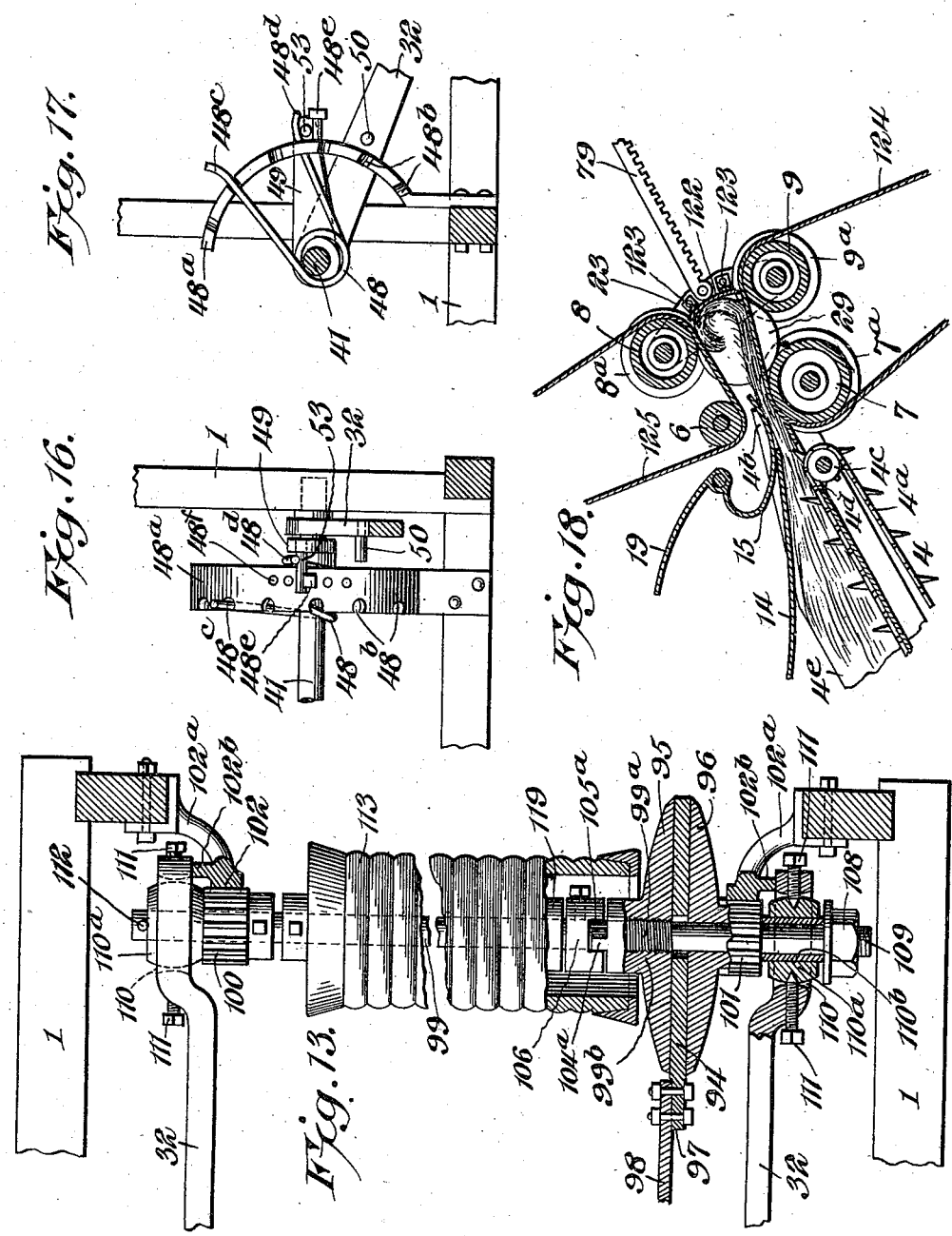

UMMO FRANKLIN LUEBBEN, OF LINCOLN, NEBRASKA, ASSIGNOR TO PATENT HOLDING COMPANY, OF LINCOLN, NEBRASKA.

BALING-PRESS.

972,884.      Specification of Letters Patent.      Patented Oct. 18, 1910.

Application filed March 29, 1909. Serial No. 486,415.

*To all whom it may concern:*

Be it known that I, UMMO FRANKLIN LUEBBEN, a citizen of the United States, residing at Lincoln, in the county of Lancaster and State of Nebraska, have invented a new and useful Baling-Press, of which the following is a specification.

The invention relates to improvements in baling presses.

The object of the present invention is to improve the construction of baling presses, and to provide a comparatively simple, light and portable machine, designed for operating on all kinds of fibrous material, such as hay, straw, etc., and capable of rapidly, efficiently and cheaply forming a round bale of such material, and thereby save the great waste of such rough products.

A further object of the invention is to provide a baling machine of this character having means operable by the expansion of a bale under formation for automatically opening the bale forming mechanism to discharge the bale therefrom when the same has obtained a predetermined size.

Another object of the invention is to provide means for controlling the return of the elements or members of the bale-forming mechanism to their initial position after a bale has been completed and discharged from the press, whereby the belts or bands of the baling mechanism will be prevented from becoming displaced or tangled by a too sudden or abrupt return of the parts.

The invention also has for its object to produce an efficient friction device, adapted to apply friction to the bale-forming mechanism during the formation of a bale to regulate and render uniform the density thereof, and capable of automatically relieving the bale-forming mechanism of such friction during the return of the parts to their initial position.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a baling press, constructed in accordance with this invention. Fig. 2 is a longitudinal sectional view of the same, showing a completed bale and a partially completed bale in the process of formation. Fig. 3 is a sectional view, taken substantially on the line 3—3 of Fig. 2. Fig. 4 is an enlarged sectional view, illustrating the construction of the bale-forming mechanism and showing a completed bale. Fig. 5 is an enlarged detail sectional view, illustrating the arrangement of the parts and forming the initial wind or beginning of the bale. Fig. 6 is a diagrammatic view, illustrating the arrangement of the continuous bands or belts with relation to the rolls of the bale-forming mechanism. Figs. 7 and 8 are enlarged detail views, illustrating the construction of the locking mechanism for detachably holding one of the rolls or members to permit such roll or member to swing outward for releasing a completed bale. Fig. 9 is a detail sectional view, illustrating the construction of the supplemental friction device for controlling the return of the parts of the bale-forming mechanism to their initial positions. Fig. 10 is a detail view, illustrating the construction of the spring fingers for holding the material against the belts or bands at the bottom of the bale-forming spaces. Fig. 11 is a transverse sectional view on the line 11—11 of Fig. 2. Fig. 12 is an enlarged sectional view, illustrating one form of the main friction device for controlling the density of the bale. Fig. 13 is a similar view, showing another form of the main friction device. Figs. 14 and 15 are detail views, illustrating the manner of yieldably mounting the rear rolls of the bale-forming mechanism. Figs. 16 and 17 are enlarged detail views, illustrating the manner of adjustably mounting the spring of the lower tension roll. Fig. 18 is a detail sectional view, illustrating a modification of the invention in which separate upper and lower belts are employed instead of a continuous belt or cord. Fig. 19 is a detail view, illustrating a modification of the invention and showing another construction of the bale-forming rolls.

Like numerals of reference designate corresponding parts in all the figures of the drawings.

1 designates the frame-work of the machine, preferably mounted on wheels 2 and 3 to render the baling press portable and supporting an inclined endless carrier 4, preferably extending rearwardly from the frame and adapted to feed the mat 5 of hay, straw, or other fibrous material to the bale-forming mechanism. The material is delivered to the carrier by any suitable means and from any source of supply, and it is fed by the carrier to the bale-forming mechanism of the press.

The bale-forming mechanism of the press includes front or throat rolls 6 and 7, rear rolls 8 and 9, upper and lower tension rolls 10 and 11, and a plurality of bands 12, arranged on the said rolls and forming a central bale-receiving bight, and upper and lower loops, which gradually decrease in size as the bale-receiving bight increases with the formation of the bale. The upper and lower front rolls 6 and 7 are located at the front of the bale-forming roll and rotate at fixed points during the formation of the bale. The rolls 8 and 9 are located at the back of the bale-forming zone, and are relatively movable being gradually pressed rearwardly by the bale as the same expands. The upper front roll, as clearly illustrated in Fig. 2 of the drawings, is arranged out of contact with the bale, which is engaged by the lower front roll and the upper and lower rear rolls. By this arrangement, the incoming mat receives the full pressure whether of a true cylindrical form or not, and the machine is relieved of variable stress and loss of power is prevented.

Each belt or band, which may consist of a cord, or be constructed of other suitable material, has its central portion arranged on the front and rear rolls 6, 7 and 8 to form the bale-receiving bight, and it also extends to the tension rolls 10 and 11, forming upper and lower loops. In Fig. 6 of the drawings is illustrated the preferred manner of arranging the belts or bands on the rolls of the bale-forming mechanism. Starting at $a$ the belt extends upward around the front of the driving roll 7, and then rearwardly at $b$ to the lower rear roll 9 and then around the same as indicated by the letters $c$, $d$ and $e$. It then travels upward at $f$ passing around the front of the upper roll at $g$ and extends rearwardly at $h$ across the space between the upper and lower rolls 8 and 9 at the back thereof, and downwardly at $i$ to the lower tension roll 11, and extends upward in front of the same at $j$ to the drive roll 7, from whence it again travels to the lower rear roll 9, encircling the same as indicated by the letters $k$, $l$ and $m$. From this roll the belt extends to the upper rear roll 8 and passes around the same as indicated by the letters $n$, $o$. The belt next extends from the bottom of the rear roll 8 to the upper front roll, as indicated by the letter $p$, and passing beneath the same it extends upwardly to the upper tension roll 10, as indicated by the letter $q$. The upper tension roll is not completely encircled by the belt, which passing upward at the front of the roll 10, extends over the top of the same and then downwardly and rearwardly to the upper rear roll 8, as indicated by the letter $r$ and after passing over the roll 8 and around the back thereof, it extends forwardly to the upper front roll 6, as indicated by the letter $s$. It then passes upward from the roll 6 to the front of the upper tension roll 10, as indicated by the letter $t$, and then downward and rearward at $u$ across the rear rolls and down to the lower tension roll, as indicated by the letters $v$ and $w$. The travel of the belt is completed in passing around the lower tension roll and the last stretch of the belt extending from the lower tension roll to the front drive roll and designated by the letter $x$. It will thus be seen that the belt provides duplicate stretches connecting each of the rolls and slightly spiral in its character in the formation of the stretches. The letters indicate clearly the arrangement of the endless belt or band on the rolls of the bale-forming mechanism and by their progressive arrangement will enable the course of the belt to be traced from any point by following the letters in their alphabetical order. Instead of employing a continuous belt or band, separate upper and lower belts or bands may be used, the upper belts or bands passing around the upper rolls 6, 8 and 10, and the lower belt being arranged on the rolls 7, 9 and 11, as hereinafter more fully described and shown.

The continuous belts or bands form the bale-space 13 and provide lower inwardly or rearwardly moving surfaces at the bottom of the space to carry the material inward, and they present upwardly moving surfaces at the back of the space to turn or bend the end of the mat on itself, and the forwardly moving surfaces formed by the belts or bands at the top of the space carry the end of the material forward and downward, causing the terminal to come in contact with the mat and through the inward movement thereof, producing the initial wind or beginning of the roll, as clearly illustrated in Fig. 5 of the drawings. The upper and lower reversely moving portions of the belts or bands at the bale space 13 converge forwardly in order to carry the end of the mat into contact with the incoming material. The arrangement of the inwardly moving bottom portions of the belts, the upwardly moving rear portions and the forwardly moving top portions, after producing the initial wind or beginning of the bale, continuously rotate such wound portion and roll the material into a bale of the desired size, the rolling of the material and the subsequent formation of the bale being uninterrupted until the completed bale is discharged from the press, as hereinafter explained.

The bale space 13 inclosed by the bale-receiving bight of the belts or bands has a mouth or entrance, located opposite a throat formed by the inclined conveyer and an upper inclined shield 14, adapted to press the material downward against the conveyer for insuring a positive feed of the material into the press. The conveyer 4 includes an endless series of chains 4$^a$, provided with teeth and moving upwardly over a supporting floor 4$^b$ and arranged on sprocket wheels 4$^c$. The sprocket wheels 4$^c$, which are located at the upper end of the conveyer, extend through openings 4$^d$ of the floor 4$^b$, which is preferably constructed of sheet metal, the upper flights of the chains being movable upwardly over the floor 4$^b$, and the lower flight being spaced therefrom, as clearly illustrated in Fig. 2 of the drawings. The upper end of the floor extends to within a short distance of the roll 7 and is arranged tangentially with relation to the same. The floor of the conveyer is provided with side walls 4$^e$, which are provided at their upper ends with extensions 4$^f$, arranged at the ends of the space between the front rolls 6 and 7 and adapted to close the said space at those points to confine the material in the press.

The shield 14, which may be constructed of sheet metal, or other suitable material, is secured at its outer edge to the framework of the machine, as clearly illustrated in Figs. 1 and 2 of the drawings. The inner portion of the shield terminates adjacent to the top of the inclined endless carrier and extends beneath a series of spring fingers 15, adapted to yieldably hold the shield against the material and extending partially into the space 13 between the upper and lower bale-engaging portions of the belts or bands for holding the end of the material against the bottom portions of the belts or bands in the formation of the initial wind or roll of the material, so that the latter will be successively operated on by the said rearwardly moving bottom surfaces, upwardly moving rear surfaces and forwardly moving top surfaces. The spring fingers are arranged at intervals, as illustrated in Fig. 10 of the drawings, and they have bowed outer portions extending upwardly and supported by a transverse rod 16. The rod 16 extends across the machine and is mounted in suitable brackets 17. The rod 16 also forms a support for the inner end 18 of a platform 19, constructed of sheet metal or other suitable material and arranged to receive the completed bale. The platform 19, which is secured at its outer end to the frame of the machine, is curved longitudinally to conform to the configuration of a round bale, and it is inclined transversely for discharging the bale from the press.

The upper and lower rear rolls 8 and 9 rotate on transverse shafts 20 and 21, pivotally mounted in openings 22 of the opposite supports 23, set at an inclination and slidable along opposite guides 24, consisting of channel bars and suitably mounted at opposite sides of the frame of the machine. The terminals of the shafts 20 and 21 are pierced by pivots 25, extending across the openings 22 and disposed longitudinally of the supports, as clearly illustrated in Figs. 13 and 14 of the drawings. The openings 22 are of sufficient size to permit a limited oscillatory movement of the shafts and the rolls, which are carried by the same. The supports 23 are also capable of an oscillatory movement, as hereinafter more fully explained, and, if desired, the flexibility of the rear rolls may depend wholly on the pivotal or oscillatory movement of the supports for their flexibility, and in such case the shafts of the rear rolls may rotate in their bearings.

The channel bars have inwardly extending spaced longitudinal flanges, forming grooves or channels for the reception of arms 26, arranged in pairs at the central portions of the supports and extending downwardly therefrom in the direction of the bale-receiving space. These arms, which diverge, have curved terminal portions 27 fitting against the inner faces of the flanges of the channel bars and having opposite bearings for permitting a limited rocking movement of the supports 23. The supports rock or swing on the outer convex faces of the curved portions of the arms 27, and the straight inner portions are adjustable to engage the side flanges of the guide bars to limit such rocking movement of the supports. The inner portions of the arms are connected with lateral enlargements 28 of the supports and are located at the outer faces thereof. The pivotal mounting of the transverse shafts 20 and 21 and the slidable and pivotal connections between the supports and the guide bars 24 produce a flexibility of the upper and lower rear rolls to permit the said rolls to yield and conform to the configuration of a bale, should one end of the latter receive a heavier feed and become larger than the other end thereof. The rolls 7, 8 and 9, owing to their triangular arrangement, will adjust themselves to a conical bale, and will maintain a constant pressure on the same without undue strain on the machine or a binding of the shafts in the bearings.

When the upper and lower rear rolls 8 and 9 are at the limit of their inward or downward movement, they engage wheels 29, mounted at the lower end of the guide bars and arranged in contact with the lower front or drive roll 7. The wheels 29 are mounted on stub shafts 30, extending inwardly from the lower ends of the guide bars, and the said wheels are located at the bale-receiving space and assist in rotating the rear rolls 8 and 9 during the preliminary wind or starting of the bale, before the same has attained sufficient size to receive the pressure of the belts or bands. As soon as the bale increases in size, and is of sufficient diameter to be properly engaged by the belts or bands, the latter are maintained in engagement with the rolls with sufficient friction to insure a positive rotation of the rolls and a proper movement of the belts or bands. The bale-engaging stretches or portions, constituting the bale-receiving bight, partake of the curvature of the bale and conform to the configuration of the same. The wheels 29 engage the end portions of the rolls 7, 8 and 9, which are provided adjacent to their ends with narrow projecting annular flanges 7ª, 8ª and 9ª, adapted to keep the ends of the bale square and prevent the bale from working endwise. The rolls, however, may, as illustrated in Fig. 19 of the drawings, be provided with enlarged ends 7ᵇ, and 9ᵇ, arranged adjacent to the ends of the bale to perform the functions of the said annular flanges 7ª, 8ª and 9ª. When the enlarged ends 7ᵇ, 8ᵇ and 9ᵇ are employed, they are engaged by the wheels 29, which coöperate with the said enlarged ends in assisting the same in guiding the bale and holding the latter against endwise movement.

The upper and lower tension rolls 10 and 11 are carried by oscillatory levers 31 and 32, movable inwardly simultaneously to permit the bale-engaging portions of the belts or bands to expand with the increase in the size of the bale, and the upper and lower tension rolls are movable outwardly to take up the slack of the belts or bands when a completed bale has been discharged from the press and the parts are returned to their initial positions. The upper levers 31 are fulcrumed at an intermediate point on a transverse rod 33, and their front and rear arms are arranged at a slight angle to each other, the roll 10 being mounted at the outer terminals of the front arms on a shaft 34, journaled in suitable boxes 34ª, which are pivotally mounted on the levers by screws 35. The levers 31 are provided with enlarged openings 36 for the terminals of the shaft 34 and the journal boxes 34ª, and the pivots 35, which pierce the lever at opposite sides at the openings 36 and engage the journal boxes, permit a limited oscillatory movement of the upper tension roll to enable the latter to adapt itself to the condition of the belts or bands due to the flexibility of the members of the bale-forming mechanism.

The shaft 33, which is mounted in ears of the brackets 37, is actuated by a spring 38, and is equipped with set arms 39, which engage studs or projections 40, extending from the levers 31, the spring being adapted to swing the levers upward. The arms 39 are adjustably secured to the shaft 33 by set screws, and the spring 38, which is disposed on the shaft, is connected at one end with the frame of the machine, or other stationary part, and its other end 38ª engages a stud 39ª, extending laterally from one of the arms 39. The arms 39 of the shaft are arranged in alinement and the spring, which actuates the shaft, is adapted to engage the arms 39 with the stud 40 of either lever, and thereby tends to bring the levers 31 into alinement.

The lower levers 32, which are also of angular shape, extend rearwardly and are fulcrumed at their inner or front ends on a transverse rod 41, and the lower tension roll 11 is arranged between the rear ends of the levers 32, and is capable of a limited movement similar to the upper tension roll in order to adapt itself to the condition of the bands or belts. The rear arms of the upper levers 31 are connected at 43 with the lower levers 32 by means of opposite rods 42, which are pivoted at their upper terminals to the said levers 31. The lower ends of the rods 42 are provided with longitudinal slots or openings 44, receiving headed studs 45 of the lower levers 32, and adapted to permit an independent movement of the upper roll when the same is actuated by the spring 38.

The transverse rod 41 is mounted in brackets 46, and the lower levers 32 are provided at their inner ends with hubs 47, which are loosely arranged on the rod 41. The rod or shaft 41 is actuated by a coiled spring 48, and is provided with set arms 49, which engage studs 50, projecting from the inner faces of the levers 32. The arms 49 are provided with openings to receive the rod or shaft 41, and are rigidly connected with the same by set screws 51, or other suitable fastening devices. The coiled spring 48, which is disposed on the shaft, has one end adjustably held by means of an arcuate ratchet bar 48ª, provided at its lower end with an attaching portion, secured to the frame of the machine. The inner side edge of the arcuate ratchet bar is provided at intervals with notches 48ᵇ, adapted to receive the end 48ᶜ of the spring 48, and they enable the end 48ᶜ of the spring to be adjusted to vary the tension thereof. The other end 48ᵈ of the spring engages a stud 53 of the adjacent arm 49, and actuates the shaft to swing the ends of the arms 49 downward. The levers 32 are relieved of the action of the spring 48 before they reach the limit of their downward movement, and this is effected by means of a stop pin 48ᵉ, adjustably mounted on the arcuate ratchet bar 48ª and arranged in the path of the stud 53. The stop 48ᵉ, which is adapted to be raised or lowered by means of a series of perforations 48ᶠ, receives the stud 53 and relieves the levers of the pressure of the spring, when the studs 50 of the levers swing to a point below the horizontal plane of the stop pin 48ᵉ. The adjustment of the stop pin enables the parts to be arranged for adapting the mechanism for ejecting larger or smaller bales, and by adjusting the end 48ᶜ of the spring, the tension of the latter may be increased or diminished to furnish more or less force to throw out a heavier or lighter bale. The elements of the bale-forming mechanism keep the bale suspended between the three rolls 7, 8 and 9 at all stages of its growth, and the incoming mat will receive the most effective compression by the lower front roll, resulting from the tension of the belts. The most effective work performed in the formation of a dense bale is done just as the mat is being pressed onto the bale by the lower front or throat roll 7. The inward movement of the upper and lower tension rolls is harmonized and rendered practically uniform by having the length of the connecting rods 42 slightly in excess of the distance between the shafts 33 and 41. The lower spring 48 is adapted to throw out the bale and return the roll 11, and with the aid of the spring 38 and gravity to return the rolls 8 and 9 to their initial position, when a completed bale has been released and ejected. The lower spring is assisted in this operation by the force of gravity acting on the lower levers 32 and the lower tension roll and the connecting rods.

The upper front roll 6 constitutes a bale-releasing member, and when the bale reaches a predetermined size the roll 6 is tripped and swings upward and outward from its position at the entrance of the bale-receiving space, and thereby releases the bale. The upward or outward movement of the roll 6 is effected through the operation of the upper spring 38, which swings the front arms of the upper levers 31 and the upper tension roll upward as soon as the upper loops of the belts are slackened. This slackening of the upper loops of the belts and the sudden releasing of the pressure on the front portion of the bale results in the bale being ejected from the bale-receiving space. The bale is thrown forwardly and upwardly onto the platform 19, which operates as a chute in effecting the lateral discharge of the bale from the press.

The upper front roll 6 is arranged on a transverse shaft 55, rigidly mounted in the opening 56 of the inclined arms 57 by means of set screws 58. The inclined arms 57 are mounted on the inclined guide bars, and are connected at their upper ends with the same by means of suitable pivots 59 of brackets 60, secured to the outer faces of the guide bars, but the oscillatory arms 57 may be pivotally mounted in any other preferred manner.

The bale-tripping roll or member 6 is held in operative position during the formation of a bale by means of locking devices 61, including L-shaped dogs or levers, fulcrumed at their angles on the brackets 17 by means of suitable pivots 62 and having their arms arranged at an inclination, as clearly illustrated in Figs. 7 and 8 of the drawings. The outer engaging arm of each dog or lever extends upwardly at the lower end of the inclined roll-carrying arm 57, and is provided at its inner side edge with an engaging portion 63 beveled at the inner edge and engaging the lower end of the arm 57 at such beveled portion. The beveling of the engaging portion of the dog or lever enables the arm 57 to oscillate the dog or lever and disengage itself therefrom when the said dog or lever is free to move. The other arm of the dog or lever extends back to the oscillatory roll-carrying arm 57, and is equipped with a cushion 64, adapted to be engaged by the roll-carrying arm, which swings the rear arm of the pawl or dog backward, and thereby carries the portion 63 of the front arm of the dog or lever into engagement with it to automatically lock the roll 6 after a completed bale has been ejected and the parts returned to their initial positions.

The cushion 64, which is adapted to relieve the pawls or dogs of the jar incident to the return of the roll 6 and thereby prevent injury to the locking mechanism, may be conveniently formed by a slidable bolt 65 and a spring 66. The bolt 65, which pierces the rear arm of the dog or lever, is provided at its upper end with a head and has a nut 67 at its lower end. The spring 66 is mounted in a recess or socket 68 of the dog or lever, and is interposed between the bottom of the recess or socket and the bolt head, which is struck by the roll-carrying arm 57 in the closing movement of the same.

The dogs or levers are maintained in engagement with the roll-carrying arm by toggle links 69 and 70, connected together at their proximate ends by suitable pivots 71. The link 69 is connected with the front arm of the dog or lever 61 by a suitable pivot 72, and the other link 70 is mounted on a transverse rod 73, which connects the toggle link 70 of the locking mechanism at each side of the press, and causes the said mechanism to simultaneously release the roll-carrying arms. The transverse rod 73 is equipped with an arm 74, preferably formed integral with one of the toggle links 70 and connected with an operating rod 75, arranged at an inclination and extending along the upper portion of one of the inclined guides 24. Mounted upon the upper portion of the operating rod is an adjustable collar 76, secured to the rod by a set screw, or other suitable fastening means and provided with an inwardly extending transversely disposed lug or projection 77, adapted to be engaged by a lug or projection 78 of one of a pair of inclined rack bars 79, which are connected with the supports 23 and movable outwardly with the same. The construction, however, may be reversed, a fixed lug or projection being mounted on the operating rod, and the adjustable lug or projection being carried by the rack bars. As this is an obvious change, illustration thereof is deemed unnecessary.

When the bale reaches a predetermined size, the lug or projection 78 of the rack bar 79 is carried into engagement with the lug or projection 77 of the operating rod, which is actuated a sufficient distance to operate the toggle links and release the roll 6. The pivot 71 of the toggle links is adapted to swing downward beyond the plane of the outer pivots of the said links to form a lock for maintaining the dogs or levers in engagement with the roll-carrying arm 57, and when the operating arm is moved upwardly by the said rack bar, the intermediate pivot 71 is swung upwardly beyond the plane of or a line intersecting the outer pivots and thereby permits the front arm of the L-shaped dogs or levers to swing away from the roll-carrying arms 57. The engagement of the roll-carrying arm 57 with the lower or rear arm of the dog or lever positively carries the parts of the locking mechanism from the releasing position, shown in Fig. 8, to approximately the locking position shown in Fig. 7. The gravity of the operating rod and the toggle links assist in the downward movement of the pivots 71 to hold the dogs in their engaging position.

The operating rod 75 passes through a guide 80, located above the adjacent inclined guide 24, but any other preferred means may be employed for guiding the rod 75 in its upward and downward movements.

The inclined rack bars 79, which are provided at their lower faces with teeth, are pivotally connected at their lower ends with the supports 23, which are provided with suitable pins or pivots 81. The pins or pivots 81 extend from the inner faces of the supports and pass through suitable eyes or openings of the lower ends of the rack bars. The rack bars mesh with pinions 82, mounted on a transverse shaft 83 and provided with hub portions 84, having arcuate slots 85 for the reception of pins 86. The pins and slots form a loose connection between the pinions and the shaft, and permit a limited independent rotary movement of the pinions to enable the same and the rack bars to conform to any independent movement of the supports incident to inequalities of the bale. The ends of the shaft 83 are journaled in bearings of blocks 87, which are mounted in the grooves or channels of the guide bars 24, but any other suitable means may be employed for this purpose. The shaft 83 carries a friction disk or wheel 88, coöperating with an adjustable friction member 89, which is in the form of a split collar or a metallic strap or band, having spaced terminals 90, adjustably connected by a screw 91 for regulating the frictional engagement between the friction disk 88 and the encircling member 89. The friction disk 88 and the encircling member 89 constitute a supplemental friction device and, while in a measure affecting the density of the bale, are designed primarily for retarding the return movements of the rolls of the bale-forming mechanism to avoid a too abrupt or sudden return, and to prevent the belts or bands from becoming tangled thereby. The outer encircling friction member 89 depends from a transverse bar 92, which is supported by blocks or pieces 93, secured to the exterior of the inclined guide bars 24 and extending above the same, one of the exterior blocks or pieces 93 being provided with the said guide 80.

The main friction device for controlling the density of the bale comprises an intermediate stationary disk or member 94, and inner and outer rotary disks or members 95 and 96. The intermediate disk or member 94, which has flat inner and outer side faces, is provided with a lug or attaching portion 97, projecting from the periphery of the member 94 and secured to one end of a bar 98, which extends to the transverse rod 41. The bar 98, which is provided with an eye or opening for the rod or shaft 41, holds the intermediate friction disk or member stationary.

The intermediate disk or member 94 is provided with a central opening through which passes a transverse shaft 99, which connects the outer or rear ends of the levers 32. This shaft carries pinions 100 and 101, which mesh with arcuate rack bars 102, and when the levers swing upwardly and downwardly with the lower tension roll 11, the pinions are rotated by the rack bars. The pinion 100, which is keyed or otherwise fixed to the shaft 99, communicates its rotary motion to the same, while the other pinion 101 is loose on the shaft 99. The arcuate rack bars are preferably provided with integral brackets 102$^a$ and have longitudinal ribs 102$^b$, extending laterally from the outside of the rack bars the entire length of the same and forming guiding edges or surfaces for the levers, thereby holding the tension roll and its mountings in alinement without strain on the levers 32. The brackets 102ª have flanged outer portions and are secured to opposite upright bars or members of the frame of the press. The outer friction disk 96, which is loose on the shaft 99, is preferably formed integral with the adjacent pinion 101, while the inner friction disk is provided at its hub with a lug 104, beveled at the end and operating in a tapered recess 105 of a set collar 106. The recess forms opposite shoulders and presents a cam edge to the end of the lug.

When the shaft is rotated through the upward movement of the levers 32, the shoulder at the narrow end of the recess is carried in the direction of the lug 104, and the cam edge of the recess 105 engaging the beveled end of the lug 104 forces the friction disk or member 95 outwardly with respect to the collar 106 and into engagement with the intermediate friction disk or member 94, which is also pressed into frictional engagement with the outer disk or member 96. This frictional engagement results in retarding or resisting the rotation of the shaft 99 and the upward movement of the levers 32 and controls the density of the bale. When the levers move downward after the discharge of a completed bale, the direction of the rotation of the shaft 99 is reversed and the shoulder at the large end of the recess 105 is carried toward the lug 104, which is thus released by the cam to relieve the mechanism of friction incident to the upward movement of the levers 32. By this construction the mechanism is relieved of friction during the downward movement of the levers. The intermediate friction disk or member is capable of a sufficient limited lateral movement to permit it to engage and release the outer friction disk or member. The set collar 106 is clamped to the shaft 99 by means of a set screw 107, or other suitable means and the friction is controlled from the exterior by means of a nut 108, mounted on a threaded end 109 of the shaft 99 and adapted to adjust the parts of the friction device toward and from the collar 106 to position the cam edge with relation to the lug. The operation of the main friction device in automatically applying friction to the baleforming mechanism, and in relieving the same of friction results from the rotation of the shaft 99, incident to the upward and downward movement of the levers 32.

While the cam edge of the collar and the beveled edge of the lug 104 are effective in operating the friction device, the preferred form of actuating means is illustrated in Fig. 13 of the drawings, in which the shaft 99 is equipped with an intermediate threaded portion 99ª, and the inner friction disk has an interiorly threaded hub portion 99ᵇ to engage the threads 99ª. The inner disk is also provided with a projecting lug 104ª, operating in a recess 105ª of the set collar 106. The recess 105ª is of uniform depth, and its opposite end walls are arranged to engage the lug 104ª to limit the free rotation of the inner friction disk with respect to the shaft for screwing it toward and from the intermediate friction disk or member. The threads have engaging portions, arranged at an angle with respect to the intermediate friction disk or member and operated on the same principle as the cam and beveled edges heretofore described, and when the levers move upward, the inner friction disk is engaged with the intermediate friction disk for operating the friction device, and when the levers move downward, the inner friction disk is moved inward away from the intermediate friction disk or member to relieve the mechanism of friction.

The shaft 99, which carries the lower tension roll, has a limited pivotal or oscillatory movement and is mounted in bearings or journal boxes 110ª, pivotally mounted in bearing openings 110 of the levers 32 to contribute to the flexibility of the bale-forming mechanism. The journal boxes 110ª are pivoted by means of screws 111, piercing the outer end portions of the levers 32 at opposite sides of the openings 110 and arranged in alinement with the plane intersecting the shafts 41 and 99. The nut 108 directly engages an interior bearing sleeve 110ᵇ of one of the journal boxes, and the other journal box is retained on the shaft by means of a key or pin 112.

All of the rolls of the bale-forming mechanism, with the exception of the drive roll 7, are constructed substantially the same and rotate on their respective shafts. Therefore, a detail description of the lower tension roll will be sufficient and is applicable to the other similarly constructed rolls 6, 8, 9 and 10. The roll 7 may be constructed in any desired manner. The roll 11 consists of a peripheral section or member 113, spaced hub sections 114 and a connecting section 115, forming a lubricant chamber 116 and connected to the hub section by suitable couplings 117. The outer peripheral section 113 is preferably constructed of wood to secure the desired lightness, and it is provided on its exterior with parallel annular corrugations, forming spaced grooves 118 and intervening rounded ribs. The grooves receive the belts or bands and are adapted to prevent the same from slipping along the rolls. The hub sections consist of hubs and annular portions 119, which may be either solid or in the form of spokes. The couplings 117 are interiorly threaded and engage the threaded portions of the hub sections and the connecting sleeve, which is pierced by the inner end of a filling tube 120, extending from the lubricant chamber 116 to the exterior of the roll. The outer end of the filling tube is threaded for the reception of an interiorly threaded cap 121, adapted to be removed to permit oil, or other lubricant to be supplied to the interior of the roll.

In Fig. 18 is illustrated a modification of the invention in which the bale-receiving space is formed by a lower rearwardly moving surface, a rear shield 122 and an upper forwardly moving surface. The shield 122, which is constructed of sheet metal, or other suitable material, is supported in position by means of bars 123, and it is arranged between the upper and lower rear rolls in position to be engaged by the mat as the material enters the bale-receiving space. It is adapted to turn the material upward and direct the same forward in making the preliminary wind or roll, and is effective in baling hay, straw and similar material, as it prevents the same from passing through the spaces between the rear belts or bands. The shield, however, is placed back far enough so that when the material assumes a cylindrical form, the roll no longer comes in contact with the shield, thereby avoiding friction and wear. The lower rearwardly moving surface at the bottom of the bale-receiving space is formed by a belt 124 or belts, arranged on the lower front and rear rolls and the lower tension roll, and the upper forwardly moving surface is formed by a coöperating belt 125 or belts, arranged on the upper front and rear rolls and the upper tension roll. The rear shield will enable upper and lower belts of a width corresponding with the length of the bale to be employed if desired.

Having thus fully described my invention, what I claim as new and desire to secure by Letters Patent, is:

1. A baling press of the class described provided with bale-forming mechanism including lower inwardly moving surfaces, rear upwardly moving surfaces, and top forwardly moving surfaces, said surfaces consisting of intersecting stretches of flexible elements arranged to engage and form a preliminary wind or roll of the end of the mat, and means for holding the mat against the lower inwardly moving surfaces as the same is fed into the bale-forming mechanism.

2. A baling press of the class described provided with bale-forming mechanism including lower inwardly moving surfaces, rear upwardly moving surfaces, and top forwardly moving surfaces, said surfaces consisting of intersecting stretches of flexible elements and forming a space in which the preliminary wind or roll of the mat is formed and spaced apart at the front to provide an entrance to the said space.

3. A baling press of the class described provided with bale-forming mechanism including lower surfaces moving inwardly to carry the mat rearwardly, rear surfaces moving upwardly to turn the mat upward, and upper surfaces moving forwardly to turn the mat back on itself and cause the end thereof to come in contact with the incoming material to form the preliminary wind or beginning of the bale, said surfaces consisting of intersecting stretches of flexible elements.

4. A baling press of the class described provided with bale-forming mechanism including lower surfaces moving inwardly to carry the mat rearwardly, rear surfaces moving upwardly to turn the mat upward, and upper surfaces moving forwardly to turn the mat back on itself and cause the end thereof to come in contact with the incoming material to form the preliminary wind or beginning of the bale, said surfaces consisting of intersecting stretches of flexible elements and the upper and lower moving surfaces being converged forwardly.

5. A baling press of the class described provided with bale-forming mechanism including rolls and belts, the latter having rearwardly moving bottom portions, upwardly moving rear portions and forwardly moving top portions arranged to engage the end of the mat to form the preliminary wind or roll, said portions intersecting each other.

6. A baling press of the class described provided with bale-forming mechanism including rolls and belts, the latter having rearwardly moving bottom portions, upwardly moving rear portions and forwardly moving top portions, said portions intersecting each other and forming a bale-receiving space, and the top and bottom portions being converged forwardly and spaced apart at the front of the said space to provide an entrance thereto.

7. A baling press of the class described provided with bale-forming mechanism including a front roll, spaced rear rolls movable toward and from the front roll and coöperating with the same to compress the material, and belts arranged on the rolls and forming rearwardly moving lower portions and forwardly moving upper portions extending over the top of the bale.

8. A baling press of the class described provided with bale-forming mechanism including front rolls spaced apart to form an entrance, spaced rear rolls movable toward and from the front rolls, upper and lower tension rolls movable inwardly and outwardly, and a continuous belt connecting all of the said rolls and having intersecting stretches arranged to form a central bale-receiving bight, and upper and lower loops.

9. A baling press of the class described provided with bale-forming mechanism including front rolls spaced apart to form an entrance, spaced rear rolls movable toward and from the front rolls, upper and lower tension rolls movable inwardly and outwardly, and a continuous belt connecting all of the said rolls and arranged to form upper and lower loops, and a central bale-receiving bight consisting of upper and lower stretches or portions extending between the front and rear rolls, and rear portions or stretches for connecting the rear rolls, said portions or stretches intersecting at their adjacent terminals.

10. A baling press of the class described provided with bale-forming mechanism including front rolls spaced apart to form an entrance, spaced rear rolls movable toward and from the front rolls, upper and lower tension rolls movable inwardly and outwardly, and a continuous belt connecting all of the said rolls and arranged to form upper and lower loops, and a central bale-receiving bight consisting of upper and lower stretches or portions extending between the front and rear rolls, and rear portions or stretches for connecting the rear rolls, the lower portions or stretches moving inwardly, the rear portions or stretches moving upwardly, and the upper portions or stretches moving outwardly, whereby the material is rotated or turned on itself to form a round bale.

11. A baling press of the class described provided with bale-forming mechanism including front rolls spaced apart to provide an entrance, spaced rear rolls, and upper and lower tension rolls, and a plurality of belts, each belt being continuous and connecting all of the said rolls and arranged to form duplicate upper and lower loops, and duplicate bale-receiving bights composed of upper and lower stretches connecting the front and rear rolls, and rear stretches connecting the rear rolls.

12. A baling press of the class described provided with bale-forming mechanism including spaced front and rear rolls, upper and lower tension rolls, and a plurality of belts or bands connecting the rolls and forming upper and lower loops, and a bale-receiving bight consisting of intersecting stretches of the said belts or bands, one of the members at the bale-receiving bight being movable outwardly to release the bale.

13. A baling press of the class described provided with bale-forming mechanism, including a plurality of rolls, belts arranged on the rolls and forming a bale-receiving bight consisting of intersecting stretches of the belts, one of the rolls being movable outwardly to release the bale.

14. A baling press of the class described provided with bale-forming mechanism including a lower front driving roll, an upper front roll spaced from the driving roll, spaced rear rolls, and belts arranged on the rolls and forming a bale-receiving space, the upper front roll being movable outwardly from the driving roll and the bale-receiving space to release the bale.

15. A baling press of the class described provided with bale-forming mechanism including front rolls spaced apart to form a mouth or entrance, spaced rear rolls, upper and lower tension rolls, belts arranged on the said rolls and forming a bale-receiving space between the front and rear rolls, one of the front rolls being movable outwardly with respect to the other to release the bale 16. A baling press of the class described provided with bale-forming mechanism including a lower front driving roll, an upper front roll spaced from the driving roll to provide a mouth or entrance, spaced rear rolls, upper and lower tension rolls, and belts arranged on the said rolls and forming a bale-receiving space and providing upper and lower loops, the said upper front roll being movable outward from the driving roll and the bale-receiving space to release the bale.

17. A baling press of the class described provided with bale-forming mechanism having a bale-receiving space and including lower inwardly moving surfaces, forwardly moving top surfaces, each of the said upper and lower surfaces consisting of flexible elements independently supported at spaced points, means arranged at the rear ends of such surfaces for guiding the material upward, and means for positively holding the material against the lower moving surfaces as the said material enters the bale-receiving space.

18. A baling press of the class described provided with bale-forming mechanism including lower inwardly moving surfaces, rear upwardly moving surfaces, and top forwardly moving surfaces, said surfaces consisting of intersecting flexible elements, and a spring extended into the space between the upper and lower surfaces and arranged to hold the material against the lower moving surfaces as the said material enters the bale-receiving space, whereby the end of the material will be successively acted on by the said surfaces.

19. A baling press of the class described provided with bale-forming mechanism including lower inwardly moving surfaces, and top forwardly moving surfaces, and a transverse series of spring fingers arranged at intervals and extending into the space between the said surfaces for holding the material against the bottom surfaces as the said material enters the bale-receiving space.

20. In a baling press of the class described, the combination with bale-forming mechanism, of an inclined carrier for feeding the material to the bale-forming mechanism, and a curved shield located above and arranged at an angle to the carrier and having its upper portion spaced from the carrier and arranged to hold the material against the same, said shield being secured at one end and having its other end free and yieldably engaging the material.

21. In a baling press of the class described, the combination of bale-forming mechanism including rolls, and belts arranged on the rolls and forming a bale-receiving space, an inclined carrier arranged to feed the material to the bale-forming mechanism, a shield located above the carrier and spaced from the same to form a throat and adapted to hold the material against the carrier, and a plurality of spring fingers projecting inwardly beyond the inner end of the shield and forming a continuation of the throat and arranged to press the material downward.

22. In a baling press of the class described, the combination of bale-forming mechanism including rolls and forming a bale-receiving space, an inclined carrier arranged to feed the material to the bale-forming mechanism and comprising an inclined floor provided at the upper end with openings and having side walls, the latter being provided at their upper ends with extensions, sprocket wheels extending through the said openings, and endless chains arranged on the sprocket wheels, said endless chains being provided with teeth and having upper flights moving over the floor, and a shield located above and spaced from the carrier to form a throat and secured at one end and having its other end free and adapted to hold the material yieldably against the said carrier.

23. In a baling press of the class described, the combination of a bale-forming mechanism including upper and lower front rolls spaced apart to form an entrance, and spaced rear rolls, and belts arranged on the said rolls and forming a bale-receiving space, the said upper front roll being movable outward from the lower front roll to release the bale, and a platform arranged to receive the bale.

24. In a baling press of the class described, the combination of bale-forming mechanism including upper and lower front rolls spaced apart to form an entrance, and spaced rear rolls, and belts arranged on the said rolls and forming a bale-receiving space, the said upper front roll being movable outward from the lower front roll to release the bale, and a platform arranged to receive the bale, said platform being inclined laterally to discharge the bale from one side of the press.

25. In a baling press of the class described, the combination of bale-forming mechanism including upper and lower front rolls spaced apart to form an entrance, and spaced rear rolls, and belts arranged on the said rolls and forming a bale-receiving space, the said upper front roll being movable outward from the lower front roll to release the bale, and a platform arranged to receive the bale, said platform being curved longitudinally to conform to the configuration of the bale and set at an inclination to form a chute to discharge the bale from the press.

26. In a baling press of the class described, the combination of bale-forming mechanism including spaced front rolls, spaced rear rolls, and belts arranged on the rolls and forming a bale-receiving space, the upper front roll being movable away from the lower front roll to release the bale, an inclined carrier for feeding the material to the bale-forming mechanism, a platform located above the carrier and arranged to receive the completed bale, and a plurality of spring fingers connected with the inner end of the platform and extending into the space between the front rolls and arranged to engage the material to press the same downward as it enters the bale-receiving space.

27. A baling press of the class described provided with bale-forming mechanism including a plurality of rolls, and belts arranged on the rolls and forming a bale-receiving space, some of the said rolls being pivotally mounted and arranged to rock transversely of the baling press to permit them and the belts to adjust themselves to the form of the bale.

28. A baling press of the class described provided with bale-forming mechanism including spaced upper and lower front rolls, spaced upper and lower rear rolls movable toward and from the front rolls, upper and lower tension rolls, and belts arranged on the said rolls and forming a bale-receiving space, the rear rolls and the upper and lower tension rolls being capable of a limited transverse pivotal rocking movement to conform to the shape of the bale.

29. In a baling press of the class described, the combination of bale-forming mechanism including spaced front rolls, spaced rear rolls movable toward and from the front rolls, belts arranged on the said rolls and forming a bale-receiving space, and a continuously rotatable wheel arranged to frictionally engage and assist in rotating the rear rolls when the latter are at the limit of their movement and when the bale is too small to receive the pressure of the belts.

30. In a baling press of the class described, the combination of bale-forming mechanism including spaced front and rear rolls, belts arranged on the said rolls and forming a bale-receiving space, a continuously rotatable wheel arranged to frictionally engage and assist in rotating the rear rolls when the latter are at the limit of their inward movement, said rolls being provided adjacent to their ends with narrow annular flanges arranged to guide the bale and prevent endwise movement of the same.

31. In a baling press of the class described, the combination of bale-forming mechanism including a lower front driving roll, an upper front bale-releasing roll, spaced rear rolls movable toward and from the front rolls, belts arranged on the said rolls and forming a bale-receiving space, and a continuously rotatable wheel engaging the lower drive roll to frictionally engage and assist in rotating the rear rolls when the latter are at the limit of their inward movement.

32. In a baling press of the class described, the combination of bale-forming mechanism including spaced upper and lower front rolls, spaced rear rolls movable toward and from the front rolls, and belts arranged on the said rolls and forming a bale-receiving space, a guide, and a support slidable in the guide and carrying the rear rolls.

33. In a baling press of the class described, the combination of bale-forming mechanism including spaced upper and lower front rolls, spaced rear rolls movable toward and from the front rolls, and belts arranged on the said rolls and forming a bale-receiving space, a guide, and a support slidable in the guide and carrying the rear rolls, said support having a limited rocking movement in the guide.

34. In a baling press of the class described, the combination of bale-forming mechanism including spaced upper and lower front rolls, spaced rear rolls movable toward and from the front rolls, and belts arranged on the said rolls and forming a bale-receiving space, a guide, and a support carrying the rear rolls and provided with spaced arms operating in the guide and permitting a limited rocking movement of the support.

35. In a baling press of the class described, the combination of bale-forming mechanism including spaced upper and lower front rolls, spaced rear rolls movable toward and from the front rolls, and belts arranged on the said rolls and forming a bale-receiving space, a guide, and a support carrying the rear rolls and provided with spaced arms set at an angle to each other and having curved portions operating in the guide and permitting a limited rocking movement of the support.

36. In a baling press of the class described, the combination of bale-forming mechanism including front and rear rolls, the rear rolls being movable toward and from the front rolls, and belts arranged on the rolls and forming a bale-receiving space, spaced inclined guides consisting of channel bars, and supports carrying the rear rolls and having a pivotal connection with the same and provided with arms operating in the guides and permitting a limited rocking movement of the supports.

37. In a baling press of the class described, the combination of bale-forming mechanism including front and rear rolls, the rear rolls being movable toward and from the front rolls, upper and lower tension rolls movable toward and from the said rolls, and belts arranged on the rolls and forming a bale-receiving bight, and upper and lower loops, upper and lower levers carrying the tension rolls, and a connection between the levers for causing a uniform inward movement of the tension rolls.

38. In a baling press of the class described, the combination of bale-forming mechanism including front and rear rolls, the rear rolls being movable forward and from the front rolls, upper and lower tension rolls movable toward and from the said rolls, and belts arranged on the rolls and forming a bale-receiving bight, and upper and lower loops, upper and lower levers carrying the tension rolls, and a connection between the levers for causing a uniform inward movement of the tension rolls, said connection permitting one of the tension rolls to have a limited outward movement independent of the other tension roll.

39. In a baling press of the class described, the combination of bale-forming mechanism including front and rear rolls, the rear rolls being movable toward and from the front rolls, upper and lower tension rolls movable simultaneously inward and outward, and belts arranged on the rolls, levers carrying the tension rolls, and a rod pivotally connected with the levers and having a slot receiving one of the pivots to permit one of the tension rolls to move outward independently of the other.

40. In a baling press of the class described, the combination of bale-forming mechanism including front and rear rolls, upper and lower tension rolls, and belts arranged on the rolls, upper and lower levers carrying the tension rolls and arranged to permit the same to move inwardly and outwardly simultaneously, a rod connecting the levers for causing a uniform inward movement of the tension rolls, said rod being provided with means for permitting one of the levers to swing its roll outward independently of the other, and a spring for actuating such tension roll during the independent outward movement thereof.

41. In a baling press of the class described, the combination of bale-forming mechanism including front and rear rolls, upper and lower tension rolls, and belts arranged on the rolls, upper and lower levers carrying the tension rolls and arranged to permit the same to move inwardly and outwardly simultaneously, a rod connecting the levers for causing a uniform inward movement of the tension rolls, said rod being provided with means for permitting one of the levers to swing its roll outward independently of the other, and a spring for actuating such tension roll during the independent outward movement thereof, and another spring connected with the parts for returning the same to their initial position.

42. In a baling press of the class described, the combination of bale-forming mechanism including front and rear rolls, upper and lower tension rolls movable inward simultaneously, an upper lever connected with the upper tension roll and fulcrumed at an intermediate point, a lower lever pivoted at one end and connected at the other end with the lower tension roll, and a rod connecting the levers and permitting one of the levers to have a limited independent outward movement.

43. In a baling press of the class described, the combination of bale-forming mechanism including front and rear rolls, one of the rolls being movable outwardly to release the bale, upper and lower tension rolls, and belts arranged on the rolls and forming a bale-receiving space, levers connected with the tension rolls and with each other for causing a uniform inward movement of the tension rolls, and means for throwing one of the levers outward when the bale is released.

44. In a baling press of the class described, the combination of bale-forming mechanism including a tension roll movable inwardly and outwardly, a pinion movable inwardly and outwardly with the tension roll, a rack meshing with the pinion for rotating the same, and a friction device operatively connected with the pinion for retarding the movement of the tension roll.

45. In a baling press of the class described, the combination of bale-forming mechanism including a tension roll movable inwardly and outwardly, a pinion movable inwardly and outwardly with the tension roll, a rack meshing with the pinion for rotating the same, and a friction device operatively connected with the pinion for retarding the movement of the tension roll in one direction, and means for relieving the roll of friction when moving in the opposite direction.

46. In a baling press of the class described, the combination of bale-forming mechanism including a tension roll movable inwardly and outwardly, an oscillatory arm connected with the tension roll, an arcuate rack, a pinion movable inwardly and outwardly with the tension roll and meshing with the rack, and a friction device operatively connected with the pinion for retarding the movement of the tension roll.

47. In a baling press of the class described, the combination of bale-forming mechanism including a tension roll movable inwardly and outwardly, an oscillatory arm connected with the tension roll, an arcuate rack, a pinion movable inwardly and outwardly with the tension roll and meshing with the rack, and a friction device operatively connected with the pinion for retarding the inward movement of the tension roll, means for relieving the tension roll of friction when the same moves outwardly, and a spring arranged to actuate the roll during such outward movement.

48. In a baling press of the class described, the combination of bale-forming mechanism including rolls movable inwardly and outwardly, belts arranged on the rolls, a tension roll receiving the belts, levers connected with the tension roll, a spring for normally urging the levers outwardly with respect to the bale-forming mechanism, and adjusting mechanism for regulating the tension of the spring to suit the size and weight of a bale.

49. In a baling press of the class described, the combination of bale-forming mechanism including rolls movable inwardly and outwardly, belts arranged on the rolls, a tension roll receiving the belts, levers connected with the tension rolls, a spring for normally urging the levers outwardly with respect to the bale-forming mechanism, and an arcuate rack bar provided at intervals with notches arranged to receive the spring for varying the tension thereof.

50. In a baling press of the class described, the combination of bale-forming mechanism including rolls movable inwardly and outwardly, belts arranged on the rolls, tension rolls receiving the belts, levers connected with the tension rolls, a shaft provided with arms having means for engaging the levers, a spring disposed on the shaft and having one end connected with one of the said arms and adapted to actuate the shaft, and an adjusting device connected with the other end of the spring.

51. In a baling press of the class described, the combination of bale-forming mechanism including rolls movable inwardly and outwardly, belts arranged on the rolls, a tension roll receiving the belts, levers connected with the tension rolls, a shaft provided with arms having means for engaging the levers, a spring disposed on the shaft and having one end connected with one of the said arms and adapted to actuate the shaft, and an arcuate ratchet bar having notches arranged to receive the other end of the spring for varying the tension thereof.

52. In a baling press of the class described, the combination of bale-forming mechanism including rolls movable inwardly and outwardly, belts arranged on the rolls, a tension roll receiving the belts, levers connected with the tension roll, a shaft provided with arms having means for engaging the levers, a spring disposed on the shaft and having one end connected with one of the said arms and adapted to actuate the shaft, an arcuate ratchet bar having notches arranged to receive the other end of the spring for varying the tension thereof, and means also mounted on the ratchet bar for relieving the levers of spring tension during a portion of their movement.

53. In a baling press of the class described, the combination of bale-forming mechanism including rolls movable inwardly and outwardly, belts arranged on the rolls, a tension roll receiving the belts, levers connected with the tension roll, a shaft provided with arms having means for engaging the levers, a spring disposed on the shaft and having one end connected with one of the said arms and adapted to actuate the shaft, an arcuate ratchet bar having notches arranged to receive the other end of the spring for varying the tension thereof, and an adjustable stop mounted on the arcuate bar and adapted to be arranged at different elevations and arranged in the path of one of the arms for relieving the levers of spring tension during a portion of the movement of the tension roll.

54. In a baling press of the class described, the combination of bale-forming mechanism including rolls movable inwardly and outwardly, belts arranged on the rolls, a tension roll receiving the belts, levers connected with the tension roll and provided with projecting studs, a shaft having arms arranged to engage the studs, one of the said arms being provided with a projection, a coiled spring disposed on the shaft and having one end connected with the projection for actuating the shaft, and an adjustable device arranged in the path of the said projection for relieving the levers of spring tension.

55. In a baling press of the class described, the combination of bale-forming mechanism including rolls movable inwardly and outwardly, belts arranged on the rolls, a tension roll receiving the belts, levers connected with the tension roll and provided with projecting studs, a shaft having arms arranged to engage the studs, one of the said arms being provided with a projection, a coiled spring disposed on the shaft and having one end connected with the projection for actuating the shaft, an arcuate bar having adjustable means for holding the other end of the spring, and an adjustable stop mounted on the arcuate bar and arranged in the path of the said projection for relieving the levers of spring tension.

56. In a baling press of the class described, the combination of bale-forming mechanism including front and rear rolls, a tension roll, levers connected with the tension roll, arcuate rack bars provided with ribs forming guides for the said levers, pinions meshing with the rack bars and carried by the levers, and means connected with the pinions for retarding the movement of the levers.

57. In a baling press of the class described, the combination of bale-forming mechanism including front and rear rolls, upper and lower tension rolls, and belts arranged on the rolls, levers connected with the upper and lower tension rolls and with each other, an arcuate rack, a pinion, meshing with the rack and carried by one of the levers, and means connected with the pinion for retarding the movement of the levers to control the density of the bale.

58. In a baling press of the class described, the combination of bale-forming mechanism including front and rear rolls, upper and lower tension rolls, and belts arranged on the rolls, spaced levers carrying the tension rolls, one of the levers being provided with a stud, an arm engaging the stud, and a spring connected with the arm and arranged to actuate the same to swing one of the tension rolls independently of the other.

59. In a baling press of the class described, the combination of bale-forming mechanism including front and rear rolls, upper and lower tension rolls, upper and lower levers connected with the tension rolls, a rod on which the levers of one of the tension rolls is mounted, said rod being provided with arms engaging the contiguous levers, and a spring mounted on the rod and connected with one of the arms.

60. In a baling press of the class described, the combination of bale-forming mechanism including rolls movable inwardly and outwardly with respect to each other, and a friction device for automatically retarding the movement of the rolls during the formation of a bale.

61. In a baling press of the class described, the combination of bale-forming mechanism including rolls movable inwardly and outwardly, and belts arranged on the rolls, and means connected with the said rolls for automatically preventing a too rapid inward movement thereof after the discharge of a completed bale.

62. In a baling press of the class described, the combination of bale-forming mechanism including rolls movable inwardly and outwardly, and belts arranged on the rolls, and a friction device connected with the said rolls and arranged to resist the inward and outward movement of the said rolls to automatically prevent a too sudden or abrupt inward movement of the same.

63. In a baling press of the class described, the combination of bale-forming mechanism including rolls movable inwardly and outwardly, and belts arranged on the rolls, a rack bar connected with the said rolls, a pinion meshing with the rack bar, and an automatically operable friction device connected with the pinion.

64. In a baling press of the class described, the combination of bale-forming mechanism including rolls movable inwardly and outwardly, and belts arranged on the rolls, an automatically operable friction device consisting of a friction disk or wheel connected with the pinion, and a strap or band encircling the disk or wheel.

65. In a baling press of the class described, the combination of bale-forming mechanism including rolls movable inwardly and outwardly, and belts arranged on the rolls, an automatically operable friction device consisting of a friction disk or wheel connected with the pinion, and a strap or band encircling the disk or wheel, said strap or band having spaced terminals, and adjustable connecting means for varying the friction.

66. In a baling press of the class described, the combination of bale-forming mechanism including spaced front rolls, spaced rear rolls, belts arranged on the rolls and forming a bale-receiving space, one of the front rolls being movable away from the other to release the bale, locking mechanism for holding such front roll against outward movement, and means operable by the expansion of the bale for releasing the outwardly movable roll when the bale reaches a predetermined size.

67. In a baling press of the class described, the combination of bale-forming mechanism including spaced front rolls, one of the front rolls being movable outwardly from the other to release the bale, rear rolls movable toward and from the front rolls, and belts arranged on the rolls, locking mechanism for holding the outwardly movable front roll against such movement, an operating rod connected with the locking mechanism, and means movable outwardly with the rear rolls for actuating the operating rod.

68. In a baling press of the class described, the combination of bale-forming mechanism including spaced front rolls, one of the front rolls being movable outwardly from the other to release the bale, rear rolls movable toward and from the front rolls, and belts arranged on the rolls, locking mechanism for holding the outwardly movable front roll against such movement, an operating rod connected with the locking mechanism, an adjustable device mounted on the operating rod, and means movable outwardly with the rear rolls and arranged to engage the said device for releasing the outwardly movable front roll.

69. In a baling press of the class described, the combination of bale-forming mechanism including spaced front rolls, one of the front rolls being movable outwardly from the other to release the bale, rear rolls movable toward and from the front rolls, and belts arranged on the rolls, locking mechanism for holding the outwardly movable front roll against such movement, an operating rod connected with the locking mechanism, an adjustable device mounted on the operating rod, and means movable outwardly with the rear rolls and arranged to engage the said device for releasing the outwardly movable front roll.

70. In a baling press of the class described, the combination of bale-forming mechanism including spaced front rolls, one of the front rolls being movable outwardly from the other to release the bale, rear rolls movable toward and from the front rolls, and belts arranged on the rolls, locking mechanism for holding the outwardly movable front roll against such movement, an operating rod connected with the locking mechanism, a rack bar movable outwardly with the rear rolls and provided with means for actuating the operating rod, a pinion meshing with the rack bar, and means connected with the pinion for controlling the inward movement of the rear rolls.

71. In a baling press of the class described, the combination of bale-forming mechanism including spaced rolls, one of the rolls being movable outwardly to release the bale, an arm connected with the outwardly movable roll, a dog arranged to engage the arm, and means for holding the dog in engagement with the arm and for automatically releasing the arm.

72. In a baling press of the class described, the combination of bale-forming mechanism including spaced rolls, one of the rolls being movable outwardly to release the bale, an arm connected with the outwardly movable roll, a dog arranged to engage the arm, and toggle links connected with the dog for holding the same in engagement with the arm.

73. In a baling press of the class described, the combination of bale-forming mechanism including spaced rolls, one of the rolls being movable outwardly to release the bale, an arm connected with the outwardly movable roll, a dog arranged to engage the arm, and toggle links connected with the dog for holding the same in engagement with the arm, an arm connected with one of the links, and operating mechanism for moving the latter arm to release the outwardly movable roll.

74. In a baling press of the class described, the combination of bale-forming mechanism including spaced rolls, one of the rolls being movable outwardly to release the bale, arms connected with the outwardly movable roll, opposite dogs engaging the said arms, opposite toggle links connected with the dogs for holding the same in engagement with the arms, a transverse rod connecting the toggle links, and operating mechanism for releasing the said arms.

75. In a baling press of the class described, the combination of bale-forming mechanism including spaced rolls, one of the rolls being movable outwardly to release the bale, an arm connected with the outwardly movable roll, and a dog arranged to engage the said arm and provided with an arm arranged in the path of the first-mentioned arm and adapted to be struck by the same to reëngage the dog with the first-mentioned arm.

76. In a baling press of the class described, the combination of bale-forming mechanism including spaced rolls, one of the rolls being movable outwardly to release the bale, an arm connected with the outwardly movable roll, and an approximately L-shaped dog pivoted at its angle and arranged to engage the said arm and provided at one of its arms with a cushion arranged to be struck by the first-mentioned arm to reëngage the dog with the same.

77. In a baling press of the class described, the combination of bale-forming mechanism including belts, and rolls, one of the rolls being movable outwardly to release the bale, an arm connected with the outwardly movable roll and carrying the same, a pivoted L-shaped dog having a beveled or angularly related portion engaging the arm, toggle links connected with the dog for holding the same in engagement with the arm, and operating mechanism connected with the toggle links for releasing the arm.

78. In a baling press of the class described, the combination of bale forming mechanism including belts, and rolls, one of the rolls being movable outwardly to release the bale, an arm connected with the outwardly movable roll and carrying the same, an L-shaped dog having a beveled or angularly related portion to engage the arm and provided with another portion arranged in the path of the arm and adapted to be struck by the same to reëngage the dog with the arm, toggle links connected with the dog and arranged to form a lock for holding the same in engagement with the said arm, and operating mechanism connected with the toggle links for releasing the arm.

79. In a baling press of the class described, the combination of bale-forming mechanism including belts, and rolls receiving the belts and movable inwardly and outwardly, and means for automatically applying friction to the bale-forming mechanism during one of such movements and of automatically relieving the bale-forming mechanism during the other movement.

80. In a baling press of the class described, the combination of bale-forming mechanism including spaced front and rear rolls, upper and lower tension rolls movable inwardly and outwardly, and belts arranged on the rolls, and a friction device connected with one of the tension rolls and automatically operable to apply the friction to the bale-forming mechanism during the movement of such tension roll in one direction and for automatically relieving the bale-forming mechanism of friction during the movement of such roll in the opposite direction.

81. In a baling press of the class described, the combination of bale-forming mechanism including spaced front and rear rolls, upper and lower tension rolls movable inwardly and outwardly, and belts arranged on the rolls, and a friction device connected with the lower roll and having means for automatically applying friction to the bale-forming mechanism during the upward movement of the lower tension roll and for automatically relieving the bale-forming mechanism of friction during the downward or outward movement of the lower tension roll.

82. In a baling press of the class described, the combination of bale-forming mechanism including a tension roll movable inwardly and outwardly, an arcuate rack, a pinion meshing with the rack and rotatable through the inward and outward movement of the tension roll, and a friction device including a relatively stationary member, a rotary member, and means for causing the said members to engage each other during the movement of the tension roll in one direction and for freeing the said members during the movement of the roll in the opposite direction.

83. In a baling press of the class described, the combination of bale-forming mechanism including a tension roll movable inwardly and outwardly, an arcuate rack, a pinion meshing with the rack and rotatable through the inward and outward movements of the tension roll, and a friction device including a relatively stationary member, a rotary member, means for actuating the rotary member, and coöperating angularly related faces adapted to move the said members in engagement with each other when the roll is rotated in one direction and arranged to release the members when the roll is rotated in the opposite direction.

84. In a baling press of the class described, the combination of bale-forming mechanism including a tension roll movable inwardly and outwardly, an arcuate rack, a pinion meshing with the rack and rotatable through the inward and outward movement of the tension roll, and a friction device including a relatively stationary member, a rotary member, spaced rotary means for engaging the rotary member to rotate the same, and means operable through the rotation of the rotary member for moving the same toward and from the stationary member.

85. In a baling press of the class described, the combination with bale-forming mechanism including a tension roll movable inwardly and outwardly, an arcuate rack, a pinion meshing with the rack and rotatable through the inward and outward movement of the tension roll, and a friction device including a relatively stationary member, a rotary friction member having a lug, and a rotary collar having a recess receiving the lug.

86. In a baling press of the class described, the combination of bale-forming mechanism including a tension roll movable inwardly and outwardly, an arcuate rack, a pinion meshing with the rack and rotatable inward and outward through the roll, and a tension device including an outer rotary member connected with the pinion, a relatively stationary intermediate member, an inner rotary member, and means rotating with the pinion for causing the said members to engage one another when rotating in one direction and for releasing the members when rotating in the opposite direction.

87. In a baling press of the class described, the combination of bale-forming mechanism including a tension roll movable inwardly and outwardly, a shaft on which the roll is mounted, arms carrying the shaft, an arcuate rack, a pinion mounted on the shaft and meshing with the arcuate rack, and a tension device including a relatively stationary intermediate member, an outer rotary member connected with the pinion, an inner rotary member, and means rotating the latter and for causing the said members to engage one another when the shaft is rotated in one direction and for releasing the said members when the shaft is rotated in the opposite direction.

88. In a baling press of the class described, the combination of bale-forming mechanism including a tension roll movable inwardly and outwardly, a shaft on which the roll is mounted, arms carrying the shaft, arcuate racks, pinions mounted on the shaft and meshing with the racks, one of the pinions being fastened on the shaft and the other being loose, and a tension device including a relatively stationary intermediate member, an outer rotary member connected with the loose pinion, an inner rotary member, and means carried by the shaft for rotating the inner member and for causing the said members to engage one another when the shaft is rotating in one direction and for releasing the members when the shaft is rotating in the opposite direction.

89. In a bailing press of the class described, the combination of bale-forming mechanism including a tension roll movable inwardly and outwardly, a shaft on which the roll is mounted, arms carrying the shaft, an arcuate rack, a pinion mounted on the shaft and meshing with the rack, a tension device including rotary and relatively stationary members, and means operated by the rotary movement of the pinion for causing the members to engage and release each other, and an adjusting nut for regulating the frictional engagement of the said members.

90. In a baling press of the class described, the combination of a shaft provided with screw threads, bale-forming mechanism including a tension roll mounted on the shaft and movable inwardly and outwardly, arms carrying the shaft, arcuate racks, fast and loose pinions mounted on the shaft and meshing with the racks, a tension device including a relatively stationary intermediate member, an outer rotary member connected with the loose pinion, an inner rotary member interiorly threaded and engaging the threads of the shaft, and means carried by the shaft for actuating the inner member to cause the same to engage and release the intermediate member.

91. In a baling press of the class described, the combination of a shaft provided with screw threads, bale-forming mechanism including a tension roll mounted on the shaft and movable inwardly and outwardly, arms carrying the shaft, arcuate racks, fast and loose pinions mounted on the shaft and meshing with the racks, a tension device including a relatively stationary intermediate member, an outer rotary member connected with the loose pinion, an inner rotary member interiorly threaded and engaging the threads of the shaft, said inner member being also provided with a lug, and a collar mounted on the shaft and having spaced engaging portions receiving the lug between them and adapted to actuate the inner member to cause the same to engage and release the intermediate member.

92. In a baling press of the class described, the combination of a shaft provided at its ends with journal boxes, bale-forming mechanism including a tension roll movable inwardly and outwardly and mounted on the shaft, arms receiving the shaft and provided with opposite pivots engaging the said journal boxes, a friction device for retarding the inward movement of the roll, and means for moving the roll outward.

93. In a baling press of the class described, a friction device including a shaft, means for rotating the shaft in both directions, relatively stationary and rotary members mounted on the shaft, means operable through the rotary movement of the shaft to engage and release the said members, and an adjusting nut for varying the friction.

94. In a baling press of the class described, the combination of a shaft, a journal box having an interiorly arranged sleeve receiving the shaft, relatively stationary and rotary members, means operated by the rotary movement of the shaft for engaging and releasing the members, and a nut engaging the sleeve for controlling the friction.

95. In a baling press of the class described, the combination with bale-forming mechanism including a tension roll movable inwardly and outwardly, an arcuate rack, a pinion meshing with the rack and rotatable through the inward and outward movement of the tension roll, and a friction device including a relatively stationary member, a rotary friction member having a lug, and means receiving the lug and forming opposite shoulders for engaging the lug to rotate the rotary member.

96. In a baling press of the class described, the combination with bale-forming mechanism including a tension roll movable inwardly and outwardly, an arcuate rack, a pinion meshing with the rack and rotatable through the inward and outward movement of the tension roll, and a friction device including a relatively stationary member, a rotary friction member, a rotary collar, and means operated through the rotary movement of the collar for moving the rotary friction member toward the relatively stationary friction member.

In testimony, that I claim the foregoing as my own, I have hereto affixed my signature in the presence of two witnesses.

UMMO FRANKLIN LUEBBEN.

Witnesses:
  ARTHUR L. WEATHERLY,
  W. E. GATES.